United States Patent
Gwidt et al.

(10) Patent No.: US 11,466,641 B1
(45) Date of Patent: Oct. 11, 2022

(54) MODIFYING PFI TO DI RATIO TO MITIGATE ENGINE KNOCKING

(71) Applicant: GM GLOBAL TECHNOLOGY OPERATIONS LLC, Detroit, MI (US)

(72) Inventors: J. Michael Gwidt, Brighton, MI (US); Vitor Lanznaster Penteado, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/649,749

(22) Filed: Feb. 2, 2022

(51) Int. Cl.
*F02D 41/38* (2006.01)
*F02D 35/02* (2006.01)
*F02D 41/24* (2006.01)

(52) U.S. Cl.
CPC .......... *F02D 41/38* (2013.01); *F02D 35/027* (2013.01); *F02D 41/2422* (2013.01); *F02D 2041/389* (2013.01)

(58) Field of Classification Search
CPC .... F02D 41/38; F02D 41/2422; F02D 35/027; F02D 2041/389
USPC ... 123/299, 300, 305, 435, 27 GE, 431, 525; 701/103–105, 111; 73/35.07
See application file for complete search history.

(56) References Cited

U.S. PATENT DOCUMENTS

2021/0363952 A1\* 11/2021 Salazar ................ F02M 45/086

\* cited by examiner

*Primary Examiner* — Hai H Huynh
(74) *Attorney, Agent, or Firm* — Lorenz & Kopf LLP

(57) ABSTRACT

In accordance with exemplary embodiments, methods and systems are provided for controlling knocking for an engine of a vehicle having a plurality of different types of fuel injectors and a combustion chamber. In an exemplary embodiment, the system includes one or more sensors of the vehicle and a processor. The one or more sensors are configured to measure an intensity of engine knocking for the engine. The processor is coupled to the one or more sensors, and is configured to at least facilitate adjusting a fuel injection ratio of respective amounts of fuel provided by the plurality of different types of fuel injectors to the combustion chamber, based on the intensity of the engine knocking.

15 Claims, 2 Drawing Sheets

MODIFYING PFI TO DI RATIO TO MITIGATE ENGINE KNOCKING

INTRODUCTION

The technical field generally relates to the field of vehicles and, more specifically, to control of engine knocking in vehicles.

Many vehicles today have drive systems that include engines, such as internal combustion engines. However, such engines may experience knocking under certain conditions.

Accordingly, it is desirable to provide systems and methods for controlling knocking in engines of vehicles. Furthermore, other desirable features and characteristics of the present invention will become apparent from the subsequent detailed description of the invention and the appended claims, taken in conjunction with the accompanying drawings and this

SUMMARY

In accordance with an exemplary embodiment, a method is provided for controlling knocking for an engine of a vehicle having a plurality of different types of fuel injectors and a combustion chamber, the method including: measuring, via one or more sensors of the vehicle, an intensity of engine knocking for the engine; and adjusting, via instructions provided by a processor of the vehicle, a fuel injection ratio of respective amounts of fuel provided by the plurality of different types of fuel injectors to the combustion chamber, based on the intensity of the engine knocking.

Also in an exemplary embodiment, the plurality of different types of fuel injectors include a port fuel injector and a direct fuel injector; and the step of adjusting the fuel injection ratio includes simultaneously, in accordance with the instructions provided by the processor: reducing an amount of fuel provided by the port fuel injector to the combustion chamber based on the intensity of the engine knocking; and increasing an amount of fuel provided by the direct fuel injector to the combustion chamber based on the intensity of the engine knocking.

Also in an exemplary embodiment, the reducing of the amount of fuel provided by the port fuel injector to the combustion chamber and the increasing of the amount of fuel provided by the direct fuel injector to the combustion chamber are based on the intensity of the engine knocking in combination with a look-up table stored in a computer memory.

Also in an exemplary embodiment, the step of adjusting the fuel injection ratio includes adjusting, via the instructions provided by the processor, the fuel injection ratio only on a further condition that the intensity of the engine knocking is greater than a predetermined engine knock intensity threshold.

Also in an exemplary embodiment, the method further includes: determining, via the processor using updated sensor data from the one or more sensors, whether the intensity of the engine knocking is still greater than the predetermined engine knock intensity threshold, after an initial adjustment of the fuel injection ratio; and when it is determined that the intensity of the engine knocking is still greater than the predetermined engine knock intensity threshold after the initial adjustment of the fuel injection ratio, then subsequently, in accordance with further instructions provided by the processor: further reducing the amount of fuel provided by the port fuel injector to the combustion chamber; and further increasing the amount of fuel provided by the direct fuel injector to the combustion chamber.

Also in an exemplary embodiment, the method further includes: returning the fuel injection ratio to its original prior to the adjusting, in accordance with further instructions provided by the processor, when it is determined that the intensity of the engine knocking is no longer greater than the predetermined engine knock intensity threshold.

In accordance with another exemplary embodiment, a system is provided for controlling knocking for an engine of a vehicle having a plurality of different types of fuel injectors and a combustion chamber, the system including one or more sensors of the vehicle and a processor. The one or more sensors are configured to measure an intensity of engine knocking for the engine. The processor is coupled to the one or more sensors, and is configured to at least facilitate adjusting a fuel injection ratio of respective amounts of fuel provided by the plurality of different types of fuel injectors to the combustion chamber, based on the intensity of the engine knocking.

Also in an exemplary embodiment, the one or more sensors include a plurality of electric sensors of the engine of the vehicle that are configured to measure intensities of one or more frequencies associated with engine knocking, and wherein the intensity of the engine knocking is based on the measured intensities of the one or more frequencies.

Also in an exemplary embodiment: the plurality of different types of fuel injectors include a port fuel injector and a direct fuel injector; and the processor is further configured to at least facilitate simultaneously: reducing an amount of fuel provided by the port fuel injector to the combustion chamber based on the intensity of the engine knocking; and increasing an amount of fuel provided by the direct fuel injector to the combustion chamber based on the intensity of the engine knocking.

Also in an exemplary embodiment, the processor is further configured to at least facilitate reducing the amount of fuel provided by the port fuel injector to the combustion chamber and increasing the amount of fuel provided by the direct fuel injector to the combustion chamber based on the intensity of the engine knocking in combination with a look-up table stored in a computer memory.

Also in an exemplary embodiment, the processor is further configured to at least facilitate adjusting the fuel injection ratio only on a further condition that the intensity of the engine knocking is greater than a predetermined engine knock intensity threshold.

Also in an exemplary embodiment, the processor is further configured to at least facilitate: determining, using updated sensor data from the one or more sensors, whether the intensity of the engine knocking is still greater than the predetermined engine knock intensity threshold, after an initial adjustment of the fuel injection ratio; and when it is determined that the intensity of the engine knocking is still greater than the predetermined engine knock intensity threshold after the initial adjustment of the fuel injection ratio, then subsequently: further reducing the amount of fuel provided by the port fuel injector to the combustion chamber; and further increasing the amount of fuel provided by the direct fuel injector to the combustion chamber.

Also in an exemplary embodiment, the processor is further configured to at least facilitate returning the fuel injection ratio to its original prior to the adjusting, when it is determined that the intensity of the engine knocking is no longer greater than the predetermined engine knock intensity threshold.

In another exemplary embodiment, a vehicle is provided that includes an engine, one or more sensors, and a processor. The engine has a plurality of different types of fuel injectors and a combustion chamber. The one or more sensors are configured to measure an intensity of engine knocking for the engine. The processor is coupled to the one or more sensors, and is and that is configured to at least facilitate adjusting a fuel injection ratio of respective amounts of fuel provided by the plurality of different types of fuel injectors to the combustion chamber, based on the intensity of the engine knocking.

Also in an exemplary embodiment, the one or more sensors include a plurality of electric sensors of the engine of the vehicle that are configured to measure intensities of one or more frequencies associated with engine knocking, and wherein the intensity of the engine knocking is based on the measured intensities of the one or more frequencies.

Also in an exemplary embodiment: the plurality of different types of fuel injectors include a port fuel injector and a direct fuel injector; and the processor is further configured to at least facilitate simultaneously: reducing an amount of fuel provided by the port fuel injector to the combustion chamber based on the intensity of the engine knocking; and increasing an amount of fuel provided by the direct fuel injector to the combustion chamber based on the intensity of the engine knocking.

Also in an exemplary embodiment, the processor is further configured to at least facilitate reducing the amount of fuel provided by the port fuel injector to the combustion chamber and increasing the amount of fuel provided by the direct fuel injector to the combustion chamber based on the intensity of the engine knocking in combination with a look-up table stored in a computer memory.

Also in an exemplary embodiment, the processor is further configured to at least facilitate adjusting the fuel injection ratio only on a further condition that the intensity of the engine knocking is greater than a predetermined engine knock intensity threshold.

Also in an exemplary embodiment, the processor is further configured to at least facilitate: determining, using updated sensor data from the one or more sensors, whether the intensity of the engine knocking is still greater than the predetermined engine knock intensity threshold, after an initial adjustment of the fuel injection ratio; and when it is determined that the intensity of the engine knocking is still greater than the predetermined engine knock intensity threshold after the initial adjustment of the fuel injection ratio, then subsequently: further reducing the amount of fuel provided by the port fuel injector to the combustion chamber; and further increasing the amount of fuel provided by the direct fuel injector to the combustion chamber.

Also in an exemplary embodiment, the processor is further configured to at least facilitate returning the fuel injection ratio to its original prior to the adjusting, when it is determined that the intensity of the engine knocking is no longer greater than the predetermined engine knock intensity threshold.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
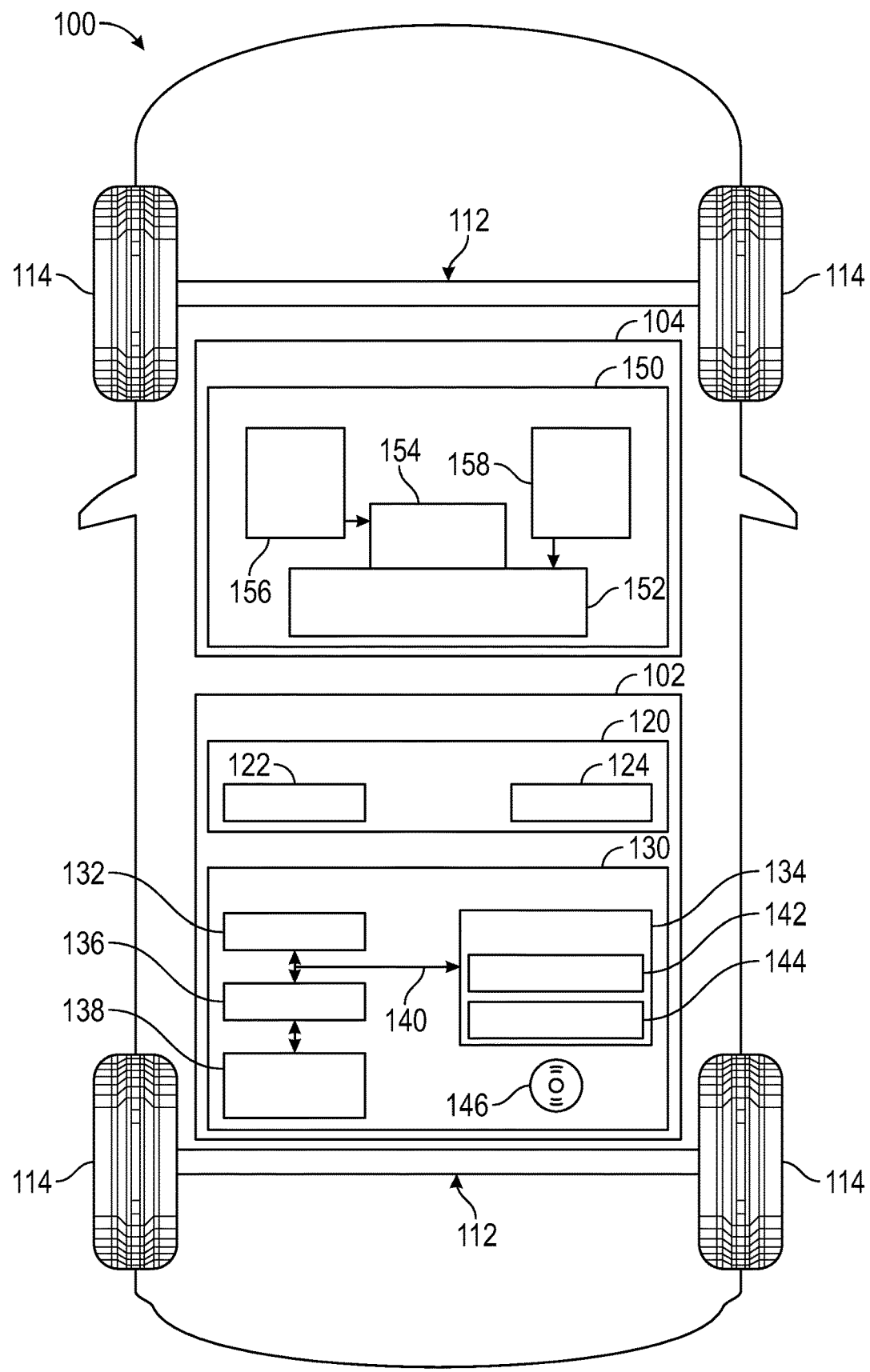
FIG. 1 is a functional block diagram of a vehicle that includes a drive system having an engine with a port fuel injector and a direct fuel injector, and a control system that is used for controlling engine knocking based on control of the port fuel injector and the direct fuel injector, in accordance with an exemplary embodiment.

FIG. 1 illustrates a vehicle 100, according to an exemplary embodiment. As described in greater detail further below, the vehicle 100 includes a drive system 104 with an engine 150 having a port fuel injector 156 and a direct fuel injector 158. Also as described in greater detail further below and depicted in FIG. 1, the vehicle 100 also includes a control system 102 that controls engine knocking of the engine 150 based on control of port fuel injector 156 and the direct fuel injector 158.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle and/or one or more other types of vehicles. In addition, in various embodiments, it will also be appreciated that the vehicle 100 may comprise any number of other types of mobile platforms.

In the depicted embodiment, the vehicle 100 includes a body 110 that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

The drive system 104 drives the wheels 114. In the depicted embodiment, the drive system 104 comprises a propulsion system, and includes the above-referenced engine 150. In various embodiments, the engine 150 comprises an internal combustion engine, such as a gasoline or diesel fueled combustion engine.

In various embodiments, the engine 150 includes a combustion chamber 152 and an intake valve 154, along with the above-referenced port fuel injector 156 and direct fuel injector 158. In various embodiments, the direct fuel injector 158 is directly coupled to the combustion chamber 152, and provides fuel directly to the combustion chamber 152. Also in various embodiments, the port fuel injector 156 is directly coupled to the intake valve 154, and supplies fuel indirectly to the combustion chamber 152 via the intake valve 154, for example when the intake valve 154 is open.

In various embodiments, the control system 102 provides instructions for controlling the drive system 104, including for controlling the engine 150. In various embodiments, the control system 102 comprises an engine control unit (ECU)

for the engine 150. Also in various embodiments, among other functionality, the control system 102 selectively controls operation of the port fuel injector 156 and the direct fuel injector 158, including respective ratios of fuel provided therefrom to the combustion chamber 152, to control knocking for the engine 150 based on the intensity of the engine knocking, while otherwise optimizing performance for the engine 150 (e.g., in terms of torque, fuel economy, and/or other factors). In various embodiments, the control system 102 provides these functions in accordance with the steps of the process 200 described further below in connection with the FIG. 2.

As depicted in FIG. 1, in various embodiments, the control system 102 includes a sensor array 120 and a controller 130.

In various embodiments, the sensor array 120 includes sensors for measuring sensor data. As depicted in FIG. 1, in various embodiments, the sensor array 120 includes one or more engine sensors 122. In various embodiments, the engine sensors 122 comprise one or more electric sensors of the engine 150 that detect engine knocking and that measure an intensity of knocking for the engine 150. In certain embodiments, the engine sensors 122 include one or more piezoelectric sensors that provide a voltage output in response to vibrational energy (in certain embodiments, in the range of 3kHz-20kHz); however, this may vary in other embodiments. In certain embodiments, the piezoelectric sensor works similar to a microphone where a piezoelectric crystal generates a varying voltage based on engine vibration intensity, and this voltage signal is sent to the control system 102 where it is processed. In various embodiments, the engine sensors 122 are attached to, disposed within, or otherwise disposed in proximity to the combustion chamber 152. Also in various embodiments, the engine sensors 122 detect frequencies associated with engine knocking, and measure and record intensities of such frequencies during operation of the engine 150.

In certain embodiments, the sensor array 120 may also include one or more other sensors 124, for example for operation of the engine. For example, in certain embodiments, the other sensors 124 may include one or more ignition sensors for detecting when the engine 150 is turned on and/or running, and so on.

In various embodiments, the controller 130 is coupled to the sensor array 120, and provides instructions for controlling the engine 150 (including controlling engine knocking based on control of the port fuel injector 156 and the direct fuel injector 158) based on the sensor data (including as to the intensity of the engine knocking). As depicted in FIG. 1, in various embodiments, the controller 130 comprises a computer system comprising a processor 132, a memory 134, an interface, a storage device 138, a bus 140, and a disk 146.

As depicted in FIG. 1, the controller 130 comprises a computer system. In certain embodiments, the controller 130 may also include the sensor array 120 and/or one or more other vehicle components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 140. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130 and the computer system of the controller 130, generally in executing the processes described herein, such as the process 200 discussed further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 (e.g., including, in various embodiments, predetermined threshold values for controlling emissions of the drive system).

The bus 140 serves to transmit programs, data, status and other information or signals between the various components of the computer system of the controller 130. The interface 136 allows communications to the computer system of the controller 130, for example from a system driver and/or another computer system, and can be implemented using any suitable method and apparatus. In one embodiment, the interface 136 obtains the various data from the sensor array 120, the drive system 104, the drive system 104, and/or one or more other components and/or systems of the vehicle 100. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including various different types of direct access storage and/or other memory devices. In one exemplary embodiment, the storage device 138 comprises a program product from which memory 134 can receive a program 142 that executes one or more embodiments of one or more processes of the present disclosure, such as the steps of the process 200 discussed further below in connection with FIG. 2. In another exemplary embodiment, the program product may be directly stored in and/or otherwise accessed by the memory 134 and/or one or more other disks 146 and/or other memory devices.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

Figure 2:
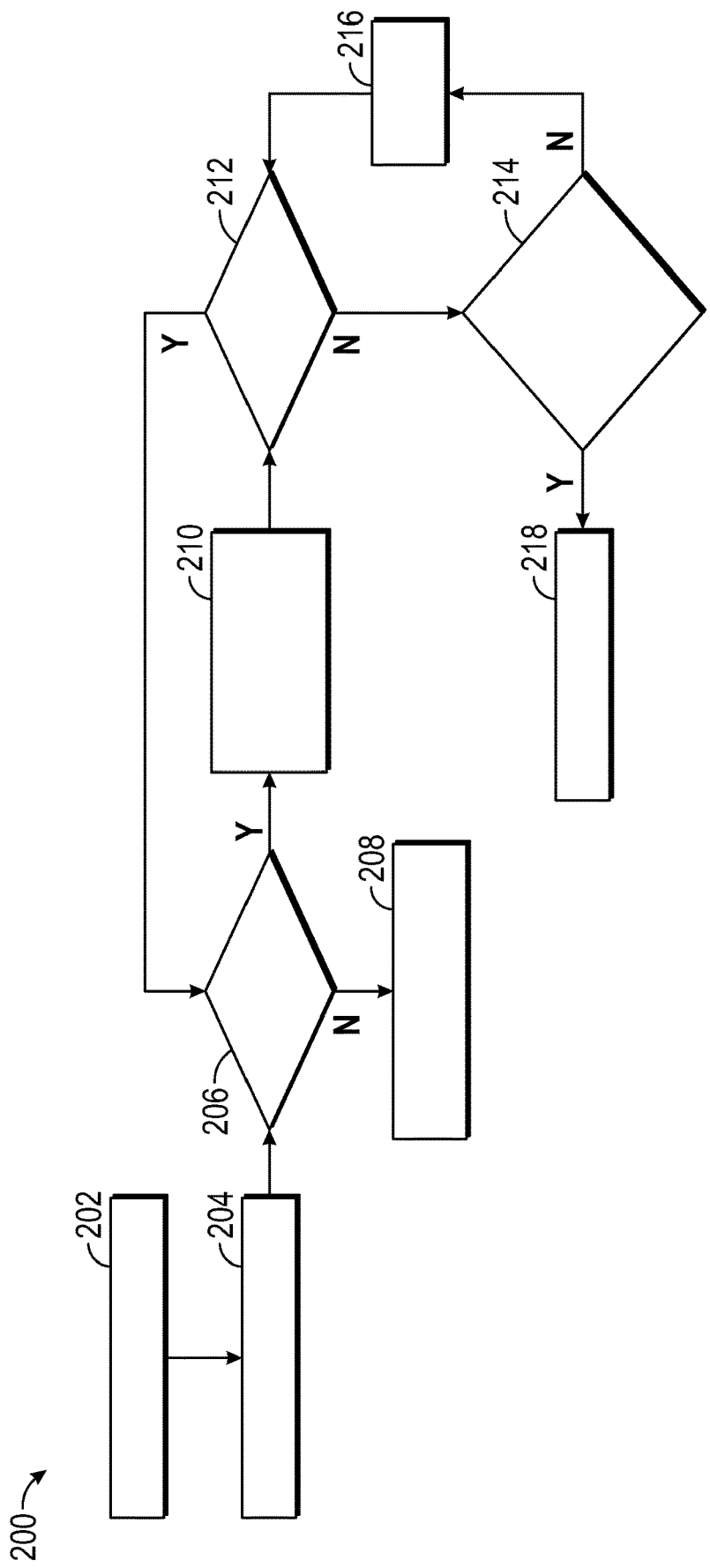
FIG. 2 is a flowchart of a process for controlling engine knocking based on control of a port fuel injector and a direct fuel injector for the engine, and that can be implemented in connection with the vehicle of FIG. 1, in accordance with an exemplary embodiment.

FIG. 2 is a flowchart of a process 200 for controlling engine knocking based on control of a port fuel injector and a direct fuel injector for the engine, in accordance with an exemplary embodiment. In various embodiments, the process 200 may be implemented in connection with the vehicle 100 of FIG. 1, including the drive system 104, the engine 150, and the control system 102 thereof.

As depicted in FIG. 2, in various embodiments the process 200 begins at 202. In certain embodiments, the process 200 begins when one or more events occur to indicate that a vehicle drive is taking place or about to take place, such as a driver, operator, or passenger entering the vehicle 100, an engine or motor of the vehicle 100 being turned on, a transmission of the vehicle 100 being placed in a "drive" mode, or the like. In various embodiments, the event(s) triggering the starting of the process 200 are determined based on sensor data from one or more of the other sensors 124 of FIG. 1 (e.g., from ignition sensors in certain embodiments). Also in certain embodiments, the control system 102 is turned on, or "woken up" as part of step 202.

In various embodiments, engine knocking is detected at 204. In various embodiments, sensor data is obtained from the engine sensors 122 of FIG. 1, and engine knocking is determined based on the sensor data from the engine sensors 122. In various embodiments, during step 204, electric sensors (e.g., piezoelectric sensors) of the engine sensors 122 detect knocking at one or more known knocking frequencies, along with an intensity of engine knocking at such known frequencies. In certain embodiments, the knock detection is performed using an algorithm inside the control system 102 that divides the voltage signal into bins that range (e.g., that range from 0 to 25Hz in certain embodiments); however, this may vary in other embodiments. Also in certain embodiments, consecutive frequency bins are grouped together into frequency "Ranges". In certain embodiments, single or multiple ranges are selected (e.g., as a function of revolutions per minute in certain embodiments) for determining the intensity. In certain embodiments, during development the engine background noise intensity is determined, and the knock detection thresholds are calculated as a calibratable number of standard deviations above the adaptable background (non-knocking) average intensity.

In various embodiments, a determination is made as to whether a fuel injection ratio is greater than a predetermined threshold (step 206). In various embodiments, this determination is made by the processor 132 of FIG. 1 based on current instructions provided thereto to the port fuel injector 156 and the direct fuel injector 158 of FIG. 1. In certain embodiments, the fuel injection ratio (also referred to herein as "PDI Ratio") comprises a ratio of (a) fuel provided by the port fuel injector 156 to the combustion chamber 152 to (b) the total fuel provided by the port fuel injector 156 and the direct fuel injector 158 combined to the combustion chamber 152, in accordance with the following equation:

$$\text{PDI Ratio} = (\text{PFI}_{Fuel})/(\text{PFI}_{Fuel} + \text{DI}_{Fuel}) \quad \text{(Equation 1)}$$

in which $\text{PFI}_{Fuel}$ represents the amount of fuel provided by the port fuel injector 156 to the combustion chamber and $\text{DI}_{Fuel}$ represents the amount of fuel provided by the direct fuel injector 158 to the combustion chamber 152.

Also in various embodiments, the predetermined threshold of step 206 is stored in the memory 134 as a stored value 144 thereof. In certain embodiments, the predetermined threshold of step 206 is equal to zero. In certain other embodiments, the predetermined threshold of step 206 may be approximately equal to zero, or some predetermined amount above zero.

In various embodiments, if it is determined in step 206 that the PDI ratio is not greater than the predetermined threshold of FIG. 1 (e.g., zero, in one embodiment), the process then proceeds to step 208. During step 208, traditional knock control techniques are employed, instead of adjusting the PDI ratio. Specifically, in certain embodiments, during step 208, the processor 132 of FIG. 1 provides instructions to the drive system 104 for a reduction in spark provided for the combustion chamber 152 of FIG. 1. In certain embodiments, the process then terminates at step 218. In certain embodiments, the process 200 may instead repeat so long as the engine 150 is operating before termination of the process 200.

Conversely, in various embodiments, if it is instead determined in step 206 that the PDI ratio is greater than the predetermined threshold of FIG. 1 (e.g., zero, in one embodiment), the process then proceeds instead to step 210. During step 210, the PDI ratio is reduced by an initial amount. Specifically, in various embodiments, the processor 132 of FIG. 1 provides instructions to the drive system 104 to decrease the PDI ratio by an initial amount. In certain embodiments, the PDI ratio is reduced in step 210 by simultaneously (a) decreasing the amount of fuel provided by the port fuel injector 156 the combustion chamber 152; and (b) increasing the amount of fuel provided by the direct fuel injector 158 to the combustion chamber 152, by respective initial amounts. In certain embodiments, the amounts of the decrease for the port fuel injector 156 and the increase for the direct fuel injector 158 are determined by the processor 132 based on a look-up table (e.g., stored in the memory 134 of FIG. 1 as stored values 144 thereof) based on the intensity of the knocking (e.g., as determined by the engine sensors 122). Also in various embodiments, the instructions for the decrease in the PDI ratio in this manner are made by the processor 132 of FIG. 1 and implemented by port fuel injector 156 (with decreased fuel provided to the combustion chamber 152) and the direct fuel injector 158 (with increased fuel provided to the combustion chamber 152).

In various embodiments, a determination is made as to whether a knock intensity is greater than a predetermined threshold (step 212). In various embodiments, during step 212, the processor 132 of FIG. 1 determines whether, after the PDI ratio reduction of step 210, engine knocking is still present with an intensity that is greater than a predetermined engine knock threshold. In certain embodiments, the engine knock intensity refers to an intensity of a frequency of engine knocking as detected or measured by the engine sensors 122 of FIG. 1. Also in certain embodiments, this determination is made by the processor 132 based on new or updated sensor readings from the engine sensors 122 of FIG. 1.

Also in various embodiments, the predetermined engine knock threshold of step 212 is stored in the memory 134 as a stored value 144 thereof. In certain embodiments, the predetermined engine knock threshold of step 212 is equal to zero. In certain other embodiments, the predetermined engine knock threshold of step 212 may be approximately equal to zero, or some predetermined amount above zero. In various embodiments, frequencies of knock events and intensity thresholds are dependent on the particular engine of the vehicle, including the bore diameter of the engine. In certain embodiments, the frequencies of knock events may be in the range of 5 to 20 kHz for certain engine types, and the intensity thresholds may be in the range of 0 to 5 for certain engine types. However, these values may vary in various different embodiments and for various types of engine designs.

In various embodiments, if it is determined in step 212 that the engine knock intensity is greater than the predetermined engine knock threshold of step 212, then process returns to the above-described step 206, in a new iteration. In various embodiments, steps 206-212 thereafter repeat in new iterations (with further reductions in the PDI ratio made as required in step 210) until a determination is made in an iteration of step 212 that the engine knock intensity is no longer greater than the predetermined engine knock threshold of step 212.

In various embodiments, once it is determined in an iteration of step 212 that the engine knock intensity is less than or equal to the predetermined engine knock threshold of step 212, the process then proceeds to step 214, described below.

In various embodiments, during step 214, a determination is made as to whether the fuel injector ratio has returns to a prior level. In various embodiments, during step 214, the processor 132 of FIG. 1 determines whether the current PDI ratio has returned to its normal or standard operating PDI level, for example prior to the detection of the engine knocking and prior to the adjustment(s) in the iteration(s) of step 210.

In various embodiments, if it is determined in step 214 that the PDI has not returned to its prior level (e.g., the PDI ratio that was present prior to the detection of the engine knocking and prior to the adjustment(s) in the iteration(s) of step 210), then the process proceeds to step 216, in which the PDI ratio is increased. In various embodiments, the processor 132 of FIG. 1 provides instructions to the port fuel injector 156 and the direct fuel injector 158 of FIG. 1 by simultaneously (a) increasing the amount of fuel provided by the port fuel injector 156 the combustion chamber 152; and (b) decreasing the amount of fuel provided by the direct fuel injector 158 to the combustion chamber 152, in respective amounts required to return the PDI ratio to its prior value. Also in various embodiments, the process then returns to step 212 in a new iteration for confirmation that engine knock intensity is still not greater than the predetermined engine knock threshold of step 212, and steps 212-216 thereafter repeat in subsequent iterations until a determination is made during an iteration of step 214 that the PDI ratio has returned to its prior value.

In various embodiments, once it is determined in step 214 that the PDI ratio has returned to its prior value, then in various embodiments the process terminates at step 218. As noted above, in certain embodiments the process 200 may instead repeat so long as the engine 150 is operating before termination of the process 200.

Accordingly, methods and systems, are provided for controlling engine knock in vehicles. In various embodiments, the disclosed methods and systems provide for reducing engine knock intensity by adjusting a ratio of fuel provided by different types of fuel injectors (namely, one or more port fuel injectors and one or more direct fuel injectors) to the combustion chamber of the engine based on the knock intensity. In various embodiments, by controlling engine knock in this manner, the disclosed methods and systems are able to reduce engine knocking without having to reduce spark for the engine. Instead, the disclosed methods and systems are able to reduce engine knocking while maintaining optimal levels of spark for the engine as well as while maintaining optimal levels of fuel economy and torque for the engine and/or for the vehicle.

It will be appreciated that the systems, vehicles, applications, and implementations may vary from those depicted in the Figures and described herein. For example, in various embodiments, the vehicle 100, control system 102, drive system 104, engine 150, components thereof, and/or other components may differ from those depicted in FIG. 1 and/or described above in connection therewith. It will also be appreciated that the steps of the process 200 may differ, and/or that various steps thereof may be performed simultaneously and//or in a different order, than those depicted in FIG. 2 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling knocking for an engine of a vehicle having a plurality of different types of fuel injectors and a combustion chamber, the method comprising:
   measuring, via one or more sensors of the vehicle, an intensity of engine knocking for the engine; and
   adjusting, via instructions provided by a processor of the vehicle, a fuel injection ratio of respective amounts of fuel provided by the plurality of different types of fuel injectors to the combustion chamber, based on the intensity of the engine knocking, wherein:
   the plurality of different types of fuel injectors comprise a port fuel injector and a direct fuel injector; and
   the step of adjusting the fuel injection ratio comprises simultaneously, in accordance with the instructions provided by the processor:
   reducing an amount of fuel provided by the port fuel injector to the combustion chamber based on the intensity of the engine knocking; and
   increasing an amount of fuel provided by the direct fuel injector to the combustion chamber based on the intensity of the engine knocking.

2. The method of claim 1, wherein the reducing of the amount of fuel provided by the port fuel injector to the combustion chamber and the increasing of the amount of fuel provided by the direct fuel injector to the combustion chamber are based on the intensity of the engine knocking in combination with a look-up table stored in a computer memory.

3. The method of claim 1, wherein the step of adjusting the fuel injection ratio comprises adjusting, via the instructions provided by the processor, the fuel injection ratio only on a further condition that the intensity of the engine knocking is greater than a predetermined engine knock intensity threshold.

4. The method of claim 3, further comprising:
   determining, via the processor using updated sensor data from the one or more sensors, whether the intensity of the engine knocking is still greater than the predetermined engine knock intensity threshold, after an initial adjustment of the fuel injection ratio; and
   when it is determined that the intensity of the engine knocking is still greater than the predetermined engine knock intensity threshold after the initial adjustment of the fuel injection ratio, then subsequently, in accordance with further instructions provided by the processor:
      further reducing the amount of fuel provided by the port fuel injector to the combustion chamber; and
      further increasing the amount of fuel provided by the direct fuel injector to the combustion chamber.

5. The method of claim 3, further comprising:
   returning the fuel injection ratio to its original prior to the adjusting, in accordance with further instructions provided by the processor, when it is determined that the intensity of the engine knocking is no longer greater than the predetermined engine knock intensity threshold.

6. A system for controlling knocking for an engine of a vehicle having a plurality of different types of fuel injectors and a combustion chamber, the system comprising:
   one or more sensors of the vehicle configured to measure an intensity of engine knocking for the engine; and
   a processor that is coupled to the one or more sensors and that is configured to at least facilitate adjusting a fuel injection ratio of respective amounts of fuel provided by the plurality of different types of fuel injectors to the combustion chamber, based on the intensity of the engine knocking;
   wherein:
      the one or more sensors comprise a plurality of electric sensors of the engine of the vehicle that are configured to measure intensities of one or more frequencies associated with engine knocking, and wherein the intensity of the engine knocking is based on the measured intensities of the one or more frequencies;
      the plurality of different types of fuel injectors comprise a port fuel injector and a direct fuel injector; and
      the processor is further configured to at least facilitate simultaneously:
         reducing an amount of fuel provided by the port fuel injector to the combustion chamber based on the intensity of the engine knocking; and
         increasing an amount of fuel provided by the direct fuel injector to the combustion chamber based on the intensity of the engine knocking.

7. The system of claim 6, wherein the processor is further configured to at least facilitate reducing the amount of fuel provided by the port fuel injector to the combustion chamber and increasing the amount of fuel provided by the direct fuel injector to the combustion chamber based on the intensity of the engine knocking in combination with a look-up table stored in a computer memory.

8. The system of claim 6, wherein the processor is further configured to at least facilitate adjusting the fuel injection ratio only on a further condition that the intensity of the engine knocking is greater than a predetermined engine knock intensity threshold.

9. The system of claim 8, wherein the processor is further configured to at least facilitate:
   determining, using updated sensor data from the one or more sensors, whether the intensity of the engine knocking is still greater than the predetermined engine knock intensity threshold, after an initial adjustment of the fuel injection ratio; and
   when it is determined that the intensity of the engine knocking is still greater than the predetermined engine knock intensity threshold after the initial adjustment of the fuel injection ratio, then subsequently:
      further reducing the amount of fuel provided by the port fuel injector to the combustion chamber; and
      further increasing the amount of fuel provided by the direct fuel injector to the combustion chamber.

10. The system of claim 8, wherein the processor is further configured to at least facilitate returning the fuel injection ratio to its original prior to the adjusting, when it is determined that the intensity of the engine knocking is no longer greater than the predetermined engine knock intensity threshold.

11. A vehicle comprising:
   an engine having a plurality of different types of fuel injectors and a combustion chamber;
   one or more sensors of the vehicle configured to measure an intensity of engine knocking for the engine; and
   a processor that is coupled to the one or more sensors and that is configured to at least facilitate adjusting a fuel injection ratio of respective amounts of fuel provided by the plurality of different types of fuel injectors to the combustion chamber, based on the intensity of the engine knocking;
   wherein:
      the one or more sensors comprise a plurality of electric sensors of the engine of the vehicle that are configured to measure intensities of one or more frequencies associated with engine knocking, and wherein the intensity of the engine knocking is based on the measured intensities of the one or more frequencies;
      the plurality of different types of fuel injectors comprise a port fuel injector and a direct fuel injector; and
      the processor is further configured to at least facilitate simultaneously:
         reducing an amount of fuel provided by the port fuel injector to the combustion chamber based on the intensity of the engine knocking; and
         increasing an amount of fuel provided by the direct fuel injector to the combustion chamber based on the intensity of the engine knocking.

12. The vehicle of claim 11, wherein the processor is further configured to at least facilitate reducing the amount of fuel provided by the port fuel injector to the combustion chamber and increasing the amount of fuel provided by the direct fuel injector to the combustion chamber based on the intensity of the engine knocking in combination with a look-up table stored in a computer memory.

13. The vehicle of claim 11, wherein the processor is further configured to at least facilitate adjusting the fuel injection ratio only on a further condition that the intensity of the engine knocking is greater than a predetermined engine knock intensity threshold.

14. The vehicle of claim 13, wherein the processor is further configured to at least facilitate:
  determining, using updated sensor data from the one or more sensors, whether the intensity of the engine knocking is still greater than the predetermined engine knock intensity threshold, after an initial adjustment of the fuel injection ratio; and
  when it is determined that the intensity of the engine knocking is still greater than the predetermined engine knock intensity threshold after the initial adjustment of the fuel injection ratio, then subsequently:
    further reducing the amount of fuel provided by the port fuel injector to the combustion chamber; and
    further increasing the amount of fuel provided by the direct fuel injector to the combustion chamber.

15. The vehicle of claim 13, wherein the processor is further configured to at least facilitate returning the fuel injection ratio to its original prior to the adjusting, when it is determined that the intensity of the engine knocking is no longer greater than the predetermined engine knock intensity threshold.

* * * * *